United States Patent
Garrity et al.

(10) Patent No.: US 9,525,364 B2
(45) Date of Patent: Dec. 20, 2016

(54) SMART GRID POWER CONVERTER

(71) Applicant: Garrity Power Services LLC, Rockwall, TX (US)

(72) Inventors: Paul Garrity, Rockwall, TX (US); Aaron Jungreis, Ra'anana (IL)

(73) Assignee: Garrity Power Services LLC, Rockwall, TX (US)

( * ) Notice: Subject to any disclaimer, the term of this patent is extended or adjusted under 35 U.S.C. 154(b) by 134 days.

(21) Appl. No.: 14/507,395

(22) Filed: Oct. 6, 2014

(65) Prior Publication Data
US 2015/0109833 A1     Apr. 23, 2015

Related U.S. Application Data

(60) Provisional application No. 61/887,863, filed on Oct. 7, 2013.

(51) Int. Cl.
*H02M 5/458* (2006.01)
*H02M 7/797* (2006.01)
(Continued)

(52) U.S. Cl.
CPC .............. *H02M 7/797* (2013.01); *H02M 1/36* (2013.01); *H02M 1/42* (2013.01);
(Continued)

(58) Field of Classification Search
CPC ........... H02M 1/36; H02M 1/42; H02M 1/44; H02M 2001/0058; H02M 2001/007; H02M 3/285; H02M 3/33569; H02M 7/797; Y02B 70/12; Y02B 70/1433; Y02B 70/1441; Y02B 70/1491; Y02E 10/56
(Continued)

(56) References Cited

U.S. PATENT DOCUMENTS

2002/0054498 A1*  5/2002  Cho .................. H02M 3/3376
                                                        363/132
2007/0188958 A1*  8/2007  Sase ...................... H02M 1/32
                                                        361/93.1
(Continued)

FOREIGN PATENT DOCUMENTS

JP          10-174452 A       6/1998

OTHER PUBLICATIONS

International Search Report and Written Opinion of the International Search Authority dated Jan. 16, 2015 for co pending PCT Application No. PCT/US2014/059357; 9 pages.

*Primary Examiner* — Jessica Han
*Assistant Examiner* — Demetries A Gibson
(74) *Attorney, Agent, or Firm* — Hovey Williams LLP

(57) ABSTRACT

A DC-to-AC power converter is disclosed. The power converter has a DC input to receive DC power from a photovoltaic device, an AC output configured for direct connection to an AC mains power supply line, six semiconductor switches, one isolated high-frequency power transformer, two high-frequency inductors, a small resonant capacitor, and a large non-electrolytic (e.g. film) capacitor energy storage component. One of the semiconductor switches located on the primary side of the transformer operates to regulate the voltage across the non-electrolytic capacitor energy storage component. A second semiconductor switch located on the primary side of the transformer provides a resonant reset for the energy stored in the transformer and allows the first semiconductor switch to operate with nearly zero-voltage-switching. The other four semiconductor switches and a high-frequency inductor coupled to the ac output operate with a variable switching frequency to produce a sinusoidal current into the ac output such that the sinusoidal current may be either in phase or out of phase with the ac output voltage.

19 Claims, 17 Drawing Sheets

(51) Int. Cl.
*H02M 1/36* (2007.01)
*H02M 1/42* (2007.01)
*H02M 3/335* (2006.01)
*H02M 1/44* (2007.01)
*H02M 3/28* (2006.01)
*H02M 1/00* (2006.01)

(52) U.S. Cl.
CPC .......... *H02M 3/33569* (2013.01); *H02M 1/44* (2013.01); *H02M 3/285* (2013.01); *H02M 2001/007* (2013.01); *H02M 2001/0058* (2013.01); *Y02B 70/12* (2013.01); *Y02B 70/1433* (2013.01); *Y02B 70/1441* (2013.01); *Y02B 70/1491* (2013.01); *Y02E 10/56* (2013.01)

(58) Field of Classification Search
USPC .......................................................... 363/37
See application file for complete search history.

(56) References Cited

U.S. PATENT DOCUMENTS

| | | | |
|---|---|---|---|
| 2008/0084713 A1* | 4/2008 | Baurle | H02M 3/33515 363/21.01 |
| 2008/0123373 A1 | 5/2008 | Roesner et al. | |
| 2010/0034002 A1 | 2/2010 | Ilic | |
| 2011/0298305 A1 | 12/2011 | Chisenga | |
| 2012/0014152 A1* | 1/2012 | Nakamura | H02M 1/4258 363/126 |
| 2012/0081934 A1* | 4/2012 | Garrity | H02M 7/46 363/37 |
| 2012/0250360 A1* | 10/2012 | Orr | H02M 3/3376 363/21.02 |
| 2013/0094261 A1 | 4/2013 | Kern | |

* cited by examiner

SMART GRID POWER CONVERTER

PRIORITY ENTITLEMENT

This non-provisional application claims priority to U.S. Provisional Patent Application Ser. No. 61/887,863 filed on Oct. 7, 2013, entitled "SMART GRID MICROINVERTER," which is herein incorporated by reference in its entirety. This application and the Provisional Patent Application have at least one common inventor.

FIELD OF INVENTION

This invention generally relates to DC-to-AC power converters. In particular, this invention relates to photovoltaic grid-connected converters and may be of particular use with micro-inverters.

BACKGROUND

Distributed generation is growing at a fast pace as society increases its use of renewable resources such as solar energy. The majority of solar power systems in use at this time make use of multiple polycrystalline silicon photovoltaic panels connected in series which are then connected to a string inverter that pumps the power back into a utility grid. The photovoltaic panels are usually placed in series to provide a high DC voltage to the string inverters.

With the proliferation of distributed generation came some problems with stability of the utility grid. As a result, most electric utilities world-wide are now seeking increased functionality in grid-tied inverters to help the inverters stabilize the grid. One such function, for example, is the introduction of VAR compensation as a function of load. To comply with new utility requirements, inverters must be able to source or sink AC current that is out-of-phase with the grid voltage.

There are several problems with string inverters. Firstly, the high DC input voltage presents safety issues as well as fire hazards, and also requires an expensive balance of system. Secondly, the use of series-connected photovoltaic panels causes all panel power to go to zero when even a single panel is shaded. This second issue leads to reduced energy harvest in most practical systems.

The sited issues of the string inverters have been addressed in recent years through the use of micro-inverters. Micro-inverters convert energy from a single photovoltaic panel into AC power that can be sourced into the utility grid. The micro-inverter is mounted under or adjacent to the photovoltaic panel. The use of a single inverter per panel reduces the DC input voltage to that of a single panel—a voltage which is typically in the range of 20V-50V for a polycrystalline silicon panel. The use of a single inverter per panel also solves the issue of power reduction when a single panel is shaded because all non-shaded panels continue to produce usable power.

Various micro-inverter topologies have been developed and brought to market. Examples can be found in WO2007/80429A2, WO2006/48688A1, and U.S. Pat. No. 7,796,412B2. Each of these topologies has shortcomings. For example, most micro-inverters use electrolytic capacitors in their design. Electrolytic capacitors have a very limited operating lifetime, particularly when operating at the high temperatures seen on rooftops (the standard place to mount a photovoltaic panel). Furthermore, most micro-inverter topologies are designed to only source current into the grid and therefore cannot accommodate new utility requirements to produce reactive power.

Micro-inverters that do not use electrolytic capacitors typically have a very high-voltage, highly variable DC bus. This high-voltage, highly variable DC bus can cause large switching losses on the power semiconductors that are connected to the bus, high voltage stress on the inverter components, and significant production of EMI.

What is needed is a micro-inverter topology that utilizes non-electrolytic capacitors for energy storage elements, that operates with lower internal voltages, and that is capable of sinking and sourcing AC current that is out-of-phase with the utility grid voltage.

SUMMARY

According to one embodiment of the present invention there is provided a power converter comprising a DC input to receive DC power from a photovoltaic device, an AC output configured for direct connection to an AC mains power supply line, a direct-current power source coupled to an isolated DC-to-DC converter configured to hold its output voltage substantially constant, a non-electrolytic capacitor connected between the isolated converter and a DC-AC inverter, wherein the capacitor is capable of storing the difference in energy between the power produced at the converter input and the power on the AC mains, and wherein the inverter produces AC current at its output that matches the AC mains frequency but can be at a phase different from the AC mains phase. In one embodiment the DC-DC converter may be a soft-switched DC-DC converter to reduce power loss.

In one embodiment the DC-DC converter includes a first controllable semiconductor switch and a first magnetic component comprising at least two windings, a core, and a flux path, said first magnetic component further coupled to a second controllable semiconductor switch and a first electronic component comprising a capacitance. First and second controllable semiconductor switches are coupled to a first controller. The first magnetic component is further coupled to a second magnetic component comprising an inductance, a second electronic component comprising a capacitance, and a first and second semiconductor component comprising a diode. The second electronic component is further coupled to a third, fourth, fifth, and sixth controllable semiconductor switch which are in turn coupled to a second controller. The third, fourth, fifth, and sixth controllable semiconductor switches are coupled to a third magnetic component comprising an inductance and to an output of the power converter.

The first controller may be capable of controlling the first controllable semiconductor at high-frequency to regulate a voltage across the second electronic component and the first controller switches the second controllable semiconductor at high-frequency to return energy stored in the first magnetic component to the direct-current power source using a resonance of the first electronic component in such a way as to reduce switching loss of the first controllable semiconductor.

The second controller switches the third, fourth, fifth, and sixth controllable semiconductors using high-frequency pulse-width modulation to produce an ac current at the output of the power converter.

Embodiments of the present invention have the advantage of using only non-electrolytic storage elements that operate at nearly constant voltage and therefore a lower voltage than would otherwise be seen across these storage elements.

Furthermore, embodiments of the present invention are capable of sinking and sourcing output current that is significantly out-of-phase with the ac output voltage.

In an embodiment of the present invention, the power converter further comprises seventh and eighth controllable semiconductor switches that are coupled to the first controller, seventh and eighth semiconductor switches further coupled to the input direct-current power source, a third electronic component comprising a capacitance, a third semiconductor component comprising a diode such that the third semiconductor component is coupled to the first semiconductor component, and a fourth magnetic component that comprises at least two windings, a core, and a flux path. The first controller further switches the seventh and eighth controllable semiconductor switches at high-frequency to return energy stored in the fourth magnetic component to the direct-current power source using a resonance of said third electronic component in such a way as to reduce switching loss of the seventh controllable semiconductor.

Preferably, the power converter's first and fourth magnetic components share some core material in such a way that the size of the total core is reduced compared to the core required for each magnetic component individually and the flux path for each of the two magnetic components has some degree of cancellation in the shared part of the core. In other embodiments, the power converter's second or third magnetic components are also designed such that the inductance at full load is substantially lower (such as a factor of two lower) than the inductance at small loads (such as 10% load).

The preferred embodiment described above reduces the size of the magnetic components with minimal impact on the performance of the power converter.

A further preferred embodiment of the present invention comprises a controller that provides a first signal and a second signal. The first signal and second signal are rectified sinusoids with a DC offset and are in phase with each other such that the amplitude of the first signal is less than or equal to the amplitude of the second signal and the sinusoidal portion of the second signal divided by the sinusoidal portion of the first signal is a constant over the course of each half-cycle of the AC output. Furthermore, the second controller compares the current flowing in the AC bridge comprised of controllable semiconductor switches three, four, five, and six to the first signal and the second signal to determine whether to turn on any of those switches in such a way as to either decrease or increase the current through the third magnetic component. This preferred embodiment allows use of an inexpensive controller, allows the user to easily trade switching losses for output current THD, and provides an easy method of control to provide a spread-spectrum EMI signature thus reducing EMI signature at any specific frequency.

Another embodiment further comprises a first controller that produces pulse-width-modulated gate drive signals at a substantially constant frequency, such that the pulse-width-modulation frequency is increased at a predetermined load level (such as above 75% load or below 20% load). Increasing the pulse-width-modulation frequency above 75% load or below 20% load has the advantage that the size of the second magnetic component is reduced with minimal impact to the overall efficiency of the converter calculated over standard averaging methods (such as the California Energy Commission method).

BRIEF DESCRIPTION OF THE DRAWINGS

These and other aspects of the invention will now be further described, by way of example only, with reference to the accompanying figures, in which.

DETAILED DESCRIPTION

Prior Art

Figure 1A:
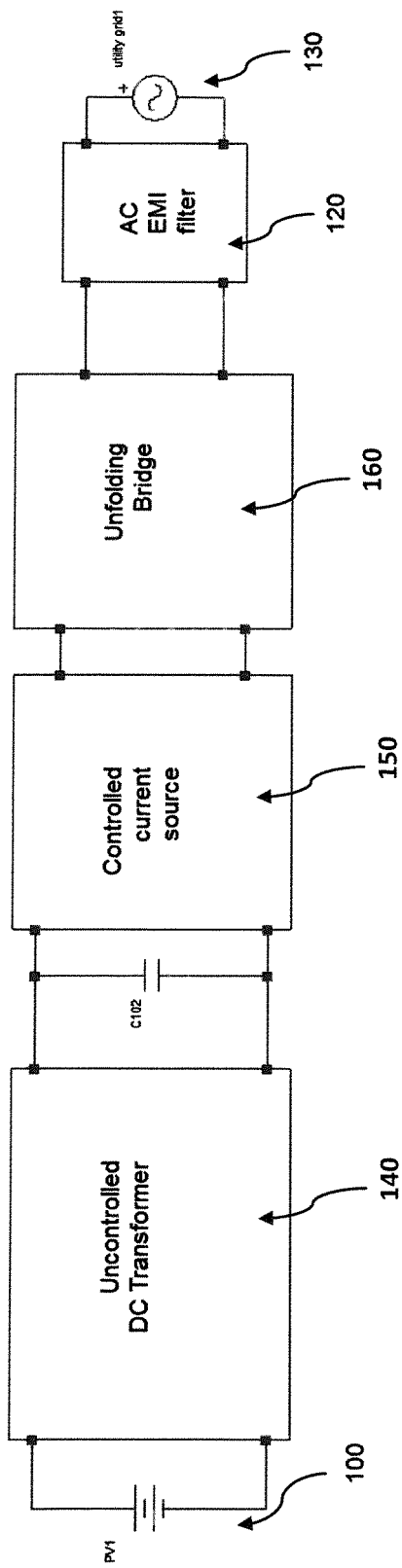
FIGS. 1A and 1B show a prior art inverter applicable for use as a micro-inverter without any electrolytic capacitors.
Figure 1B:
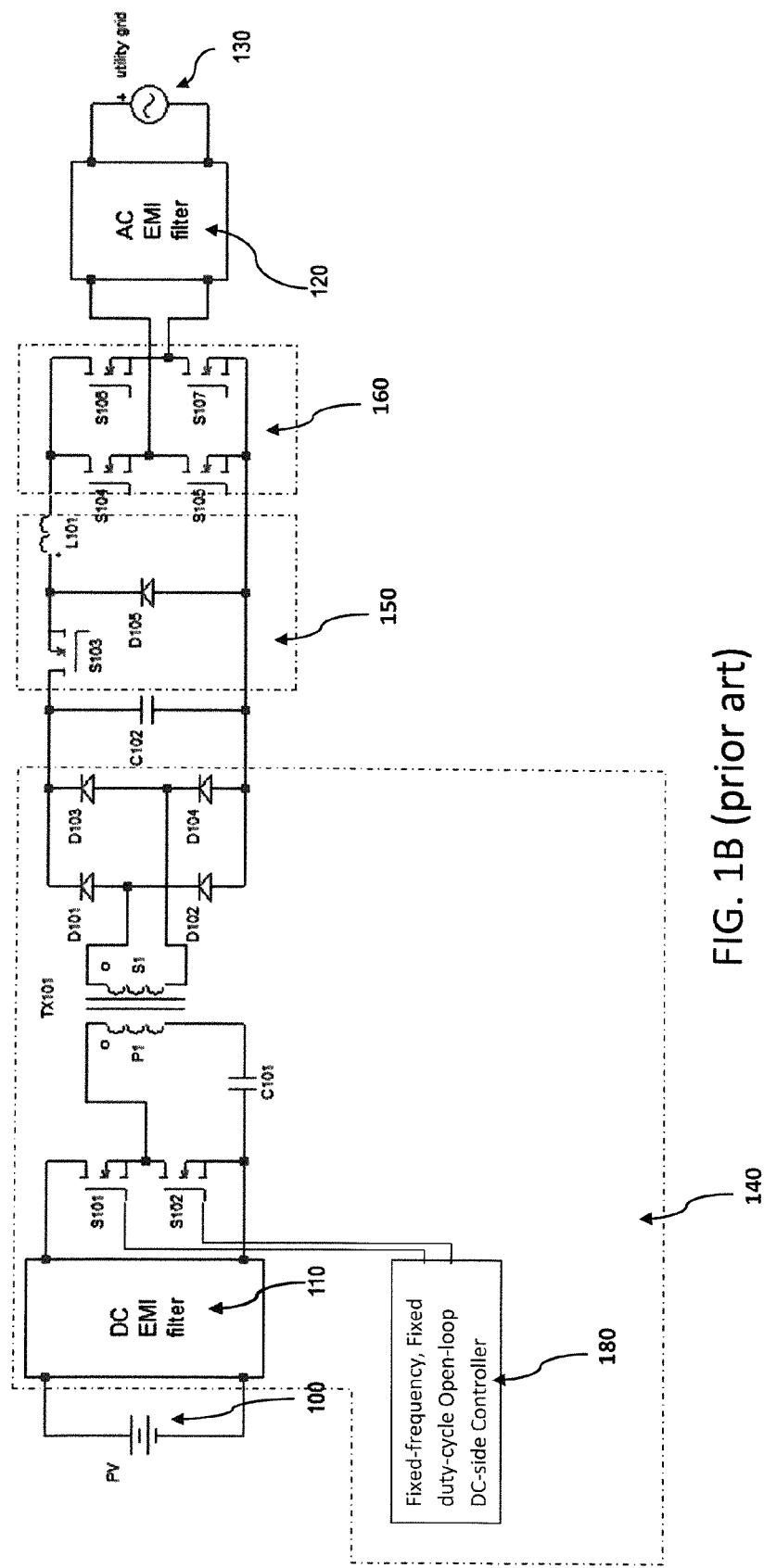

FIG. 1A shows a block diagram and FIG. 1B shows a basic circuit of a prior art micro-inverter. The converter has three stages. The first stage 140 is a DC-DC transformer that is composed of an LLC resonant converter operating at a fixed frequency that is equal to its upper resonant frequency. The second stage 150 is a controlled current source that is composed of a high-voltage buck converter without the output capacitor and which produces a full-wave rectified sinusoidal output current that is in phase with the grid. The third stage 160 is an unfolding bridge that is composed of a MOSFET full-bridge that switches at grid frequency (i.e. 50 Hz or 60 Hz) to change the current sourced by second stage 150 into a full sinusoid.

The DC transformer consists of Switches S101 and S102, controller 180, capacitor C101, transformer T101 which contains a leakage inductance (not shown), diode bridge D101, D102, D103, and D104, and DC bus cap C102. Bus cap C102 is a non-electrolytic capacitor, such as a film capacitor. Some type of energy storage is required in any photovoltaic inverter because the input power is DC while the output power is AC pulsating at double the frequency of the output voltage. Second stage 150 consists of a buck converter current source formed by switch S103, diode D105, and inductor L101. Diode D105 typically must be made of silicon carbide to reduce switching losses of the buck converter. Third stage 160 consists of a controlled bridge formed by switches S104, S105, S106, and S107.

The prior art converter shown in FIG. 1 operates as follows: Controller 180 operates the LLC converter half-bridge switches S101 and S102 at fixed frequency and complementary duty cycle slightly less than 50%. Switching frequency of S101 and S102 corresponds to the resonant frequency of C101 with the leakage inductance of transformer T101. The LLC converter then acts like a DC transformer which applies a DC voltage across C102 that is equal to half of the transformer T101 turns-ratio multiplied by the input DC voltage. The DC voltage across C102 therefore varies proportionally with the DC input voltage.

The buck converter current source produces a controlled rectified sinusoidal current source by pulse-width-modulation of switch S103. The sinusoidal current source is intentionally made to be in phase with the AC output voltage to which the inverter is connected.

The controlled bridge operates at grid frequency (i.e. 50 Hz or 60 Hz) such that switches S104 and S107 are ON only when the AC output voltage is positive, and switches S105 and S106 are ON only when the AC output voltage is negative. The controlled bridge thus allows the rectified sinusoidal current (from the buck converter current source) to produce a fully sinusoidal current that is in phase with the AC output voltage.

While the prior art inverter shown in FIG. 1 has an advantageous non-electrolytic main storage element C102, there are several shortcomings of the prior art topology.

First of all the voltage across C102 must remain proportional to the DC input voltage. Since the voltage across C102 must also always remain greater than the peak of the grid voltage in order to always be able to push current into the grid, the peak voltage across C102 can be quite high for any normal operating range of DC input voltage. For example, if the photovoltaic panel voltage peak power occurs in a range of 24V to 35V (a typical range), then the voltage across C102 must be able to swing between approximately 380V and 583V. The need to address startup operation, component tolerances for overvoltage protection, and operating voltage margin for maximum power point tracking algorithms will lead to an even higher maximum operating voltage which can exceed 600V. As a result of this high voltage, diode D105 and switches S103, S104, S105, S106, and S107 must be rated for high voltage, undergo significant switching losses, and produce high EMI. If the switches and diode are rated for 650V to keep costs down and obtain parts with low ohmic losses, the operating voltage margins will be quite small, particularly over the large temperature ranges typically seen by photovoltaic inverters, and this will result in reduced reliability. If the components are rated for more than 650V, costs and losses will increase. Furthermore, any increases to the input voltage range to accommodate a variety of photovoltaic module designs will cause additional impact to the design of the switching and silicon diode components. Another drawback to the large voltage range seen across C102 is the required size of C102. C102 must be sized for adequate energy storage at its lowest operating voltage of approximately 380V; however, it must be rated for its highest operating voltage of over 600V. Since C102 is typically a film capacitor, the size is a noticeable fraction of the overall inverter size so there can be a large penalty in the inverter size caused by the need to operate C102 over a large voltage range.

Another shortcoming of the prior art topology relates to the phasing of the output current. The buck converter current source is only able to source current—it cannot sink current. As a result, the inverter's output current must be in phase with the AC output voltage. It is not possible for this design to produce reactive power. As a result, the prior art inverter will see fewer possible applications as more and more certification bodies require all grid-connected inverters to provide reactive power.

What is needed is a micro-inverter topology that can make use of a non-electrolytic capacitor as its main storage element (so that it can have a long lifetime and high reliability operating at high temperatures on a rooftop) and yet operate that capacitor over a small voltage range which is noticeably lower than the 600V of industry-standard high-performance MOSFETs and Silicon-Carbide diodes. Furthermore, what is needed is a micro-inverter topology capable of producing reactive power. The micro-inverter must also use an efficient topology that minimizes EMI.

Preferred Embodiments

Figure 2A:
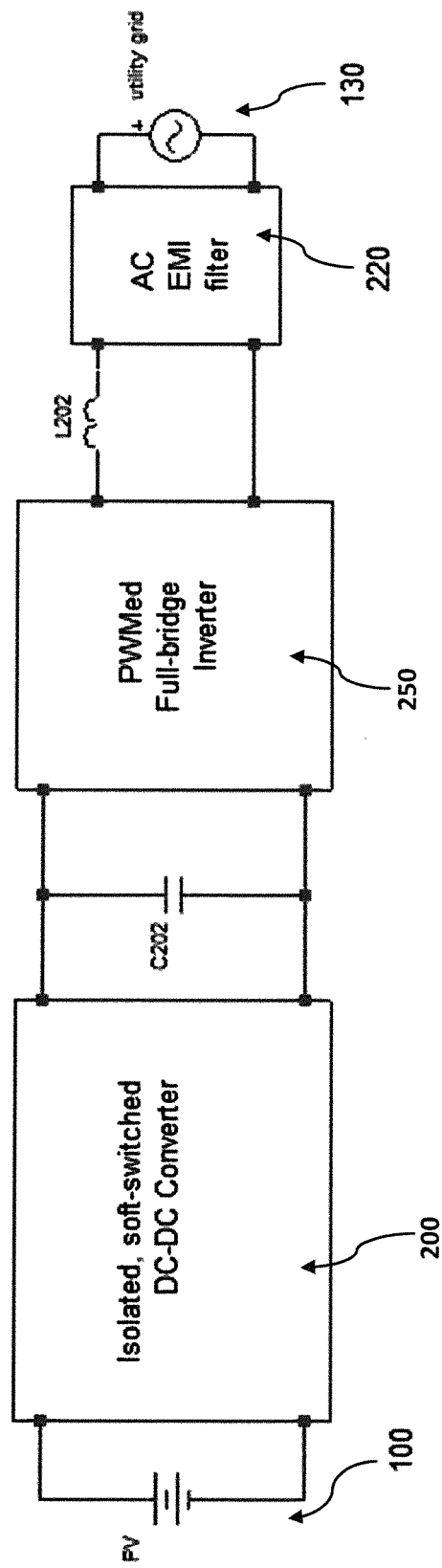
FIGS. 2A, 2B, and 2C show implementations of the present invention.

FIG. 2A shows a block diagram of an embodiment of the present invention. In order to make use of non-electrolytic capacitor storage, a two stage converter is used. However, to overcome some of the limitations of the prior art micro-inverters, the first power stage uses a soft-switched DC-DC stage 200 that is capable of holding a constant output voltage. Switching power supplies make use of controllable semiconductor switches such as MOSFETs to change the path of power flow. Semiconductor switches are able to switch at speeds orders of magnitude faster than mechanical switches. When used as a power switch, these semiconductor switches exhibit losses due to both conduction through the device as well as losses specifically associated with switching. The switching losses associated with a semiconductor switch typically vary proportionally to the voltage and current which is being switched. For example, a semiconductor switch that turns on with 100V across it to allow a current of 1 A to flow through it will exhibit approximately twice the switching loss of the same type of semiconductor that is switching 50V and 1 A of current (assuming it is operating at the same switching frequency). Switching a semiconductor with voltage across it to allow a non-zero current to suddenly pass through it is known as "hard-switching".

There are methods well-known in the art to avoid hard switching losses by using resonant components to commutate the current through the device or voltage across the device to zero (or close to zero) prior to switching the device on or off. If the voltage or current being switched is close to zero, then the switching losses in the device will similarly be close to zero. In many cases, these resonant components are parasitic components built into already existing devices in the circuit (such as a MOSFET output capacitance or a transformer's leakage inductance). The technique of using resonant components to commutate the voltage or current to zero prior to turning the device on or off is known as "soft-switching". Soft-switching can substantially increase the efficiency of a power converter.

The DC-DC stage should be soft-switched to obtain high-efficiency. The use of controllable DC-DC stage 200 overcomes one limitation of the prior art because the output voltage can be kept constant over the input voltage range, thus keeping the output voltage in a range that allows use of standard semiconductors at high operating margins.

The DC-DC stage is coupled to non-electrolytic capacitor C202. Use of a non-electrolytic capacitor is beneficial to obtain long lifetimes at high temperature operation. Use of a non-electrolytic capacitor is enabled through this two-stage design that lends itself to connecting the energy storage capacitor at the high-voltage interface. A certain amount of energy storage is needed to provide the difference in power between the DC power drawn from the photovoltaic panel and the AC power drawn by the grid. The size of the capacitor decreases proportionally with allowable capacitor ripple and also decreases proportionally with DC bus voltage. Since the DC-DC stage is operated to hold the DC bus voltage approximately constant with input photovoltaic panel voltage, the allowable capacitor ripple increases even further than would be allowed with the prior art micro-inverters, thus allowing for an even smaller non-electrolytic bus capacitor.

Block 250 is a DC-AC full bridge inverter power stage that is capable of providing both sinking and sourcing current to the grid by use of a semiconductor bridge that is switched at high-frequency. The AC bridge normally acts as a voltage source; however, the addition of inductor L202 allows the AC bridge to act as a current source. The ability to both sink and source current overcomes limitations of the prior art micro-inverters and allows the present invention to provide reactive power compensation in addition to sourcing photovoltaic power into the grid.

Figure 2B:
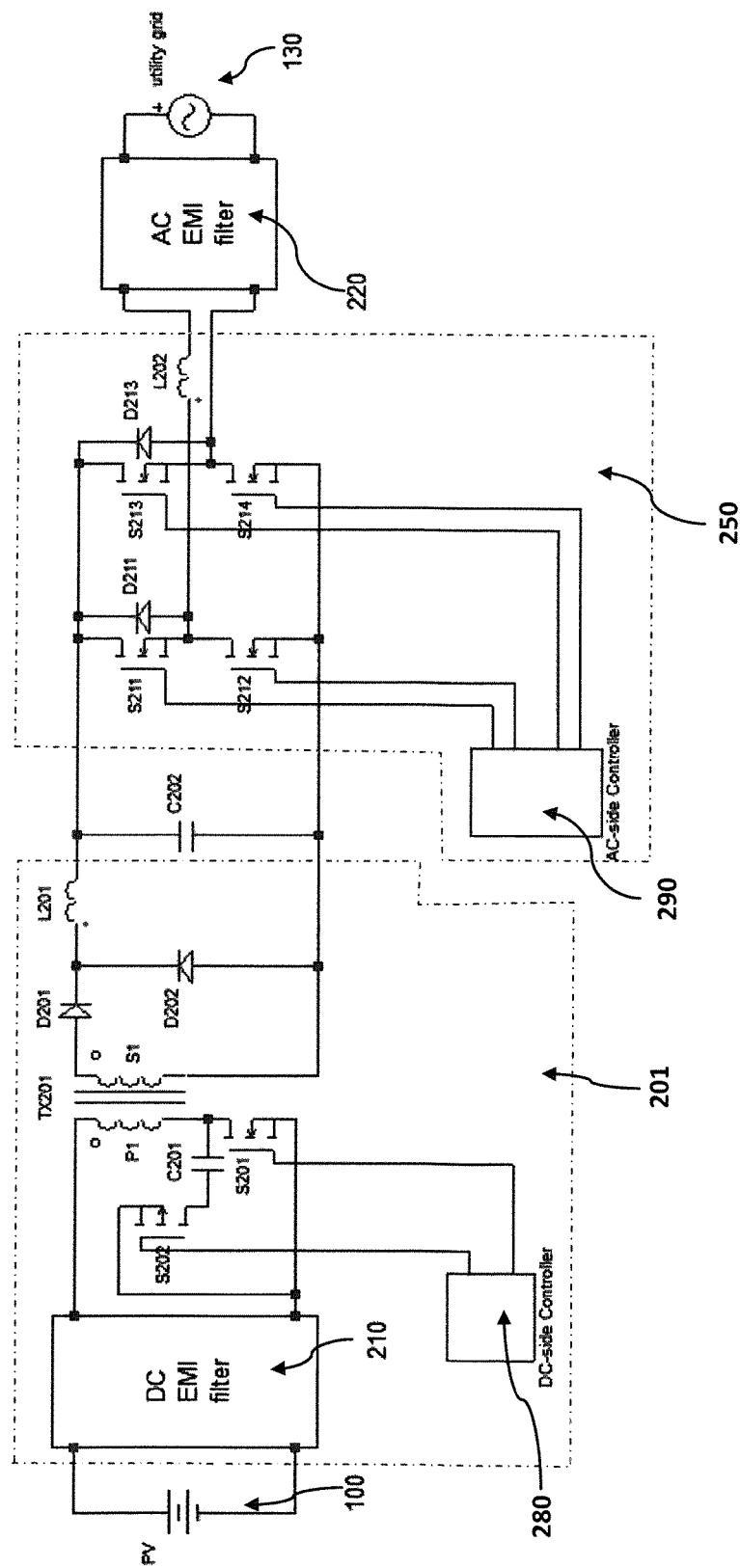

FIG. 2B shows a simplified circuit of an embodiment of the present invention that was shown in block diagram form in FIG. 2A. EMI filter 210 reduces high-frequency current from reaching DC voltage source 100. EMI filter 210 may or may not be needed depending on whether or not there are physical cables connecting the inverter to the photovoltaic module. Switch S201, transformer T201, diodes D201 and D202, inductor L201, and capacitor C201 form an isolated DC-to-DC converter 201. Switch S201 may operate with a substantially constant pulse-width-modulation frequency and with a duty-cycle required to hold the voltage on C202 to be constant.

Switch S202 is operated complementary to switch S201, with some dead-time. Switch S202 causes magnetizing current in T201 to resonate with C201, thus returning this magnetizing energy to the DC source and also accomplishing zero-voltage switching on S201. In practice S202 can be much smaller than S201. Furthermore, S202 and C201 can equally well be placed across an additional winding on T201 for the purpose of accomplishing the core-reset and zero-voltage-switching of S201.

The frequency at which S201 is operated may be constant or substantially constant, where "substantially constant" allows for small deviations in the frequency to allow what is known in the art as EMI dithering. For example, the PWM frequency could be a nominal 100 kHz, but the actual frequency could be swept from 98 kHz to 102 kHz over a period of 1 ms to reduce the EMI signature at 100 kHz and integral harmonics of 100 kHz. Furthermore, in some embodiments, the PWM frequency could be shifted either gradually or in steps at certain load break points to gain advantage in component sizing and in the inverter operation. For example, above 75% load, it could be of advantage to gradually increase the PWM frequency with load in order to hold the maximum current in inductor L1 constant, thus allowing a reduction in the size of L1. Furthermore, the PWM frequency could be increased at load levels below 20% load to keep the converter in continuous conduction mode over a larger operating range.

Figure 2C:
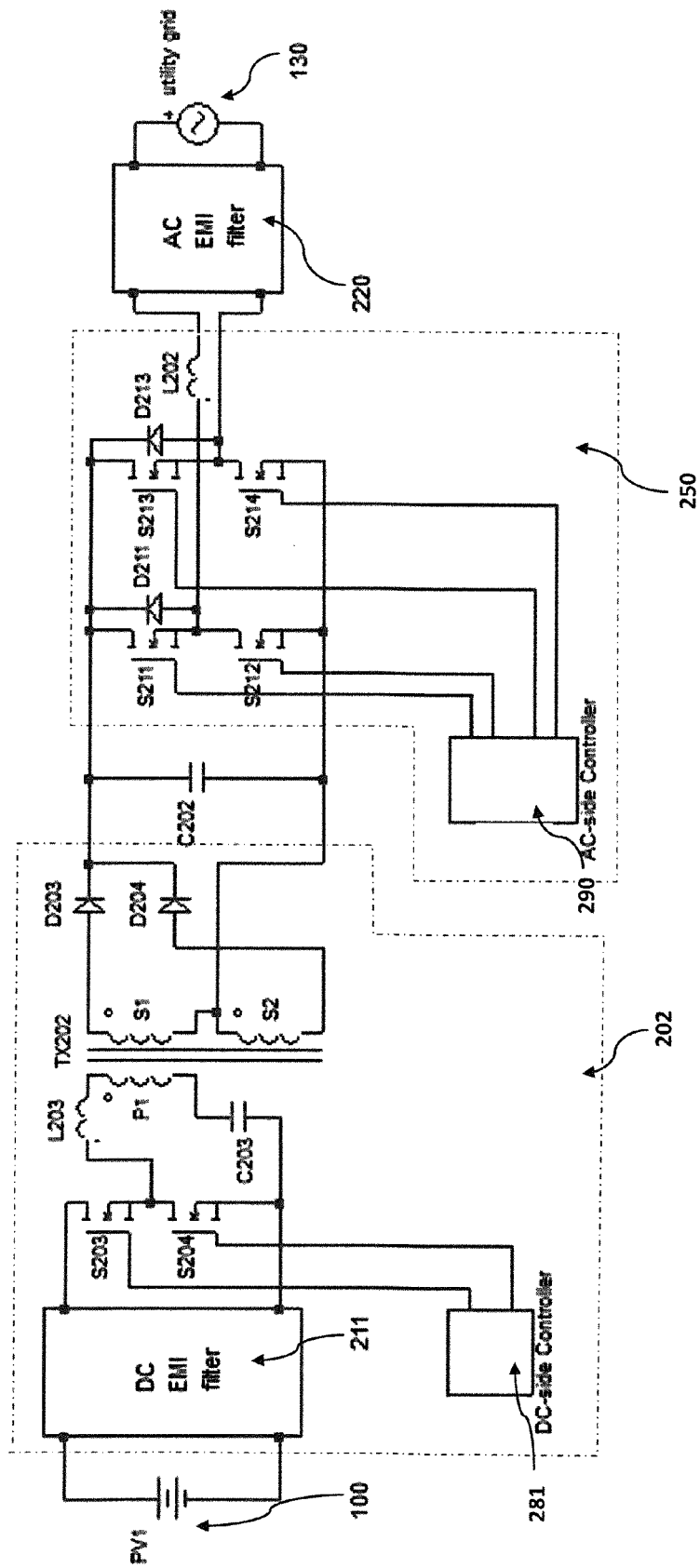

FIG. 2C shows another simplified circuit of an embodiment of the present invention that was shown in block diagram form in FIG. 2A. Operation of the circuit in FIG. 2C is similar to that of the circuit in FIG. 2B, except that for the circuit in FIG. 2B, the frequency is typically held constant and the duty cycle is varied to hold the voltage on C202 constant while for the circuit in FIG. 2C, the duty cycle is typically held constant and the frequency is typically varied to hold the voltage on C202 constant. Furthermore, the circuit in FIG. 2C uses a resonance of the capacitor C203 and inductor L203 to obtain soft-switching of the devices S203 and S204.

Referring to the circuit in FIG. 2C: EMI filter 210 reduces high-frequency current from reaching DC voltage source 100. EMI filter 210 may or may not be needed depending on whether or not there are physical cables connecting the inverter to the photovoltaic module. Switch S203, transformer T203, diodes D203 and D204, inductor L203, and capacitor C203 form an isolated DC-to-DC converter 202. Switch S203 may operate with a substantially constant pulse-width-modulation duty cycle and with a frequency required to hold the voltage on C202 to be constant.

Switch S204 is operated complementary to switch S203, with some dead-time. There are two natural resonant frequencies of the DC-DC converter. The upper resonant frequency depends on the capacitance C203 and L203. The lower resonant frequency depends on these same two components with an additional effect due to the magnetizing inductance of transformer TX202.

DC-DC Converter Operation

Figure 3:
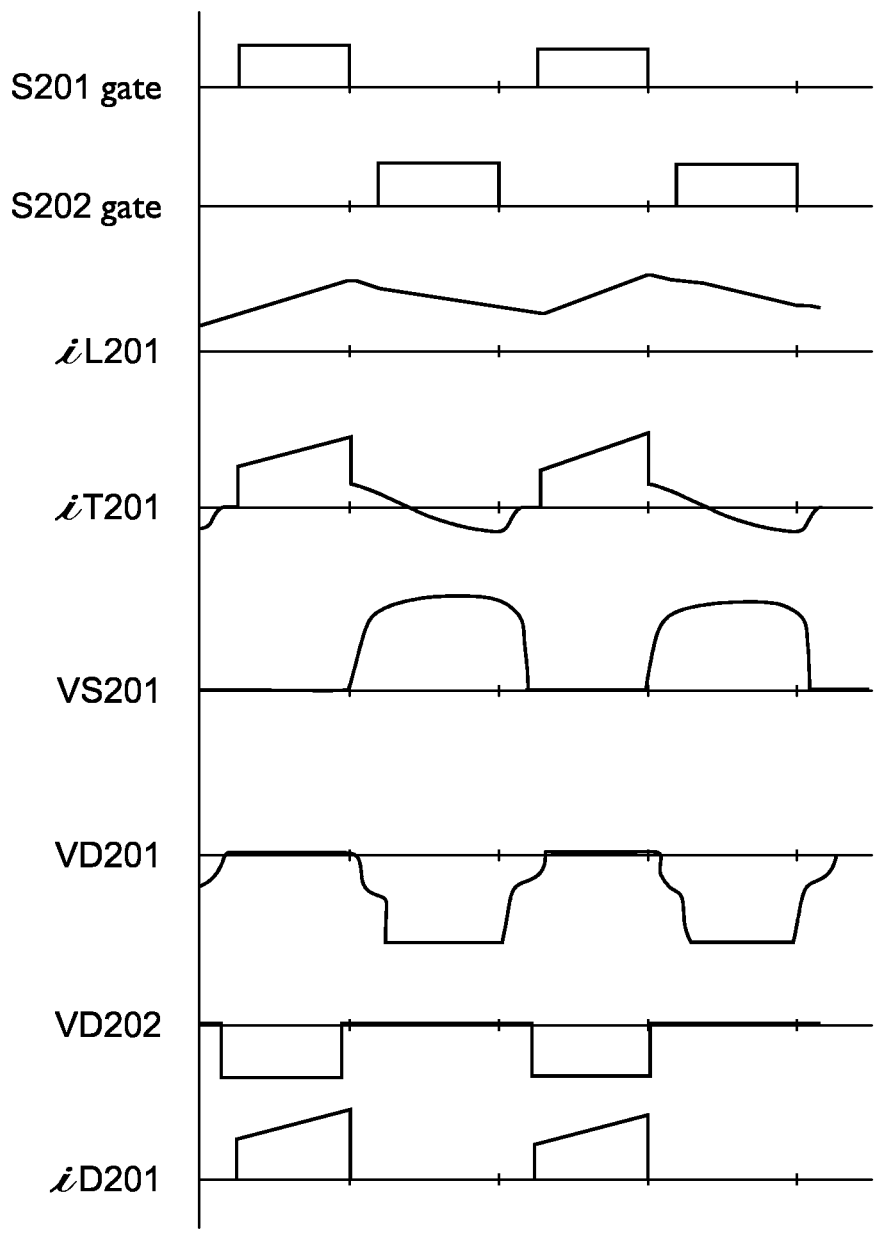
FIG. 3 shows a set of waveforms illustrating operation of the DC side of the power converter of FIG. 2B.

FIG. 3 shows a set of waveforms illustrating an example operation of the circuit in FIG. 2B. Referring to FIG. 3, S201 gate represents the gate drive on switch S201, S202 gate represents the gate drive on switch S202, iT201 represents the current through the primary of T201, iL201 represents the current through inductor L201, VS201 represents the drain-source voltage across switch S201, VD201 represents the anode-cathode voltage across diode D201, and iD201 represents the current through diode D202. These waveforms assume that capacitor C202 and inductor L201 are large enough so that during a single pulse-width-modulation switching cycle, the current through L201 remains continuous and the voltage across C202 remains almost constant. Furthermore, effects of the EMI filter are ignored for the description of the invention since they contribute negligible effect to the operation of the inverter other than to filter out very high frequency components of current from the DC source to reduce EMI.

When S201 is ON, the DC input voltage appears across the primary of T201 and therefore a voltage of transformer turns ratio N times the DC input voltage appears across the secondary of T201. When S201 is ON, D201 conducts and D202 is OFF. The DC input voltage, multiplied by N therefore appears across L201 in series with C202. Since the voltage across C202 remains nearly constant during the pulse-width-modulation switching cycle, the current through L201 rises.

When S201 turns OFF, D201 turns OFF and then D202 must turn ON to conduct the current that is flowing through L201. The voltage across C202 then causes the current in L201 to ramp down. On the primary side of the circuit, the magnetizing current in T201 flows through the drain-source capacitance of S201 and causes the voltage across S201 to quickly ramp up to the voltage level that is stored on capacitor C201. The magnetizing inductance of T201 then resonates with C201 as can be seen in the waveforms of VS201 and iT201. The body diode of S202 provides a path for the resonant current while the current is positive and prior to turn-on of S202. Before the current iT201 reaches 0, controller 280 turns on S202 so that the resonant current is able to go negative, thus returning the magnetizing energy in the transformer to the DC input. Controller 280 then turns S202 OFF prior to the turn-on of S201, allowing sufficient time between S202 turn-off and S201 turn-on for iT201 to return to 0.

The above implementation thus accomplishes zero-voltage switching in main switch S201.

Figure 4:
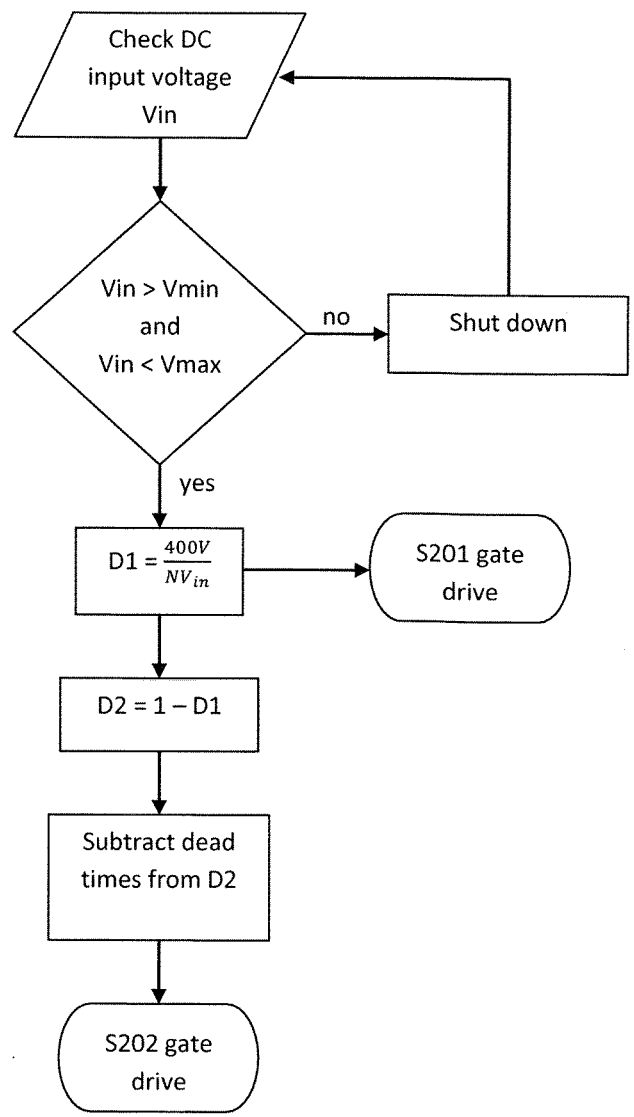
FIG. 4 shows a controller algorithm for the DC side of the power converter of FIG. 2B.

In continuous quasi steady-state operation (that is operation in which each pulse-width-modulation switching cycle is identical to the previous cycle) the average voltage across L201 must be 0 to obtain a volt-second balance. The voltage across C202 will therefore be the pulse-width-modulation duty cycle times the transformer turns ratio times the DC input voltage (minus small voltage drops that occur across the circuit component resistances and the semiconductor forward voltage drops). Since the voltage across C202 represents only an intermediate voltage inside the converter and not a final output voltage, the voltage across C202 can have a large voltage tolerance. It is therefore possible and preferable for controller 280 to operate in open-loop operation. In other words, controller 280 does not need to receive or respond to feedback on the secondary-side of the transformer, but only needs to measure the voltage across the DC input and produce a duty-cycle that is inversely proportional to the DC input voltage. FIG. 4 shows an example algorithm for operating controller 280 in open-loop operation. Open loop operation of the converter produces many advantages. For example: operation is stable over all input conditions; There is no need to place any components across the high-voltage boundary of the transformer T201; no opto-couplers are required (opto-couplers would have severe lifetime issues in a photovoltaic micro-inverter that needs to operate at high temperatures for many years on a rooftop); response-time to any changes on the DC input are immediate; component ratings do not need to take into account any transient conditions that would lead to short-term higher-currents or higher-voltages due to slow transient response since the response to input changes is immediate.

Figure 5A:
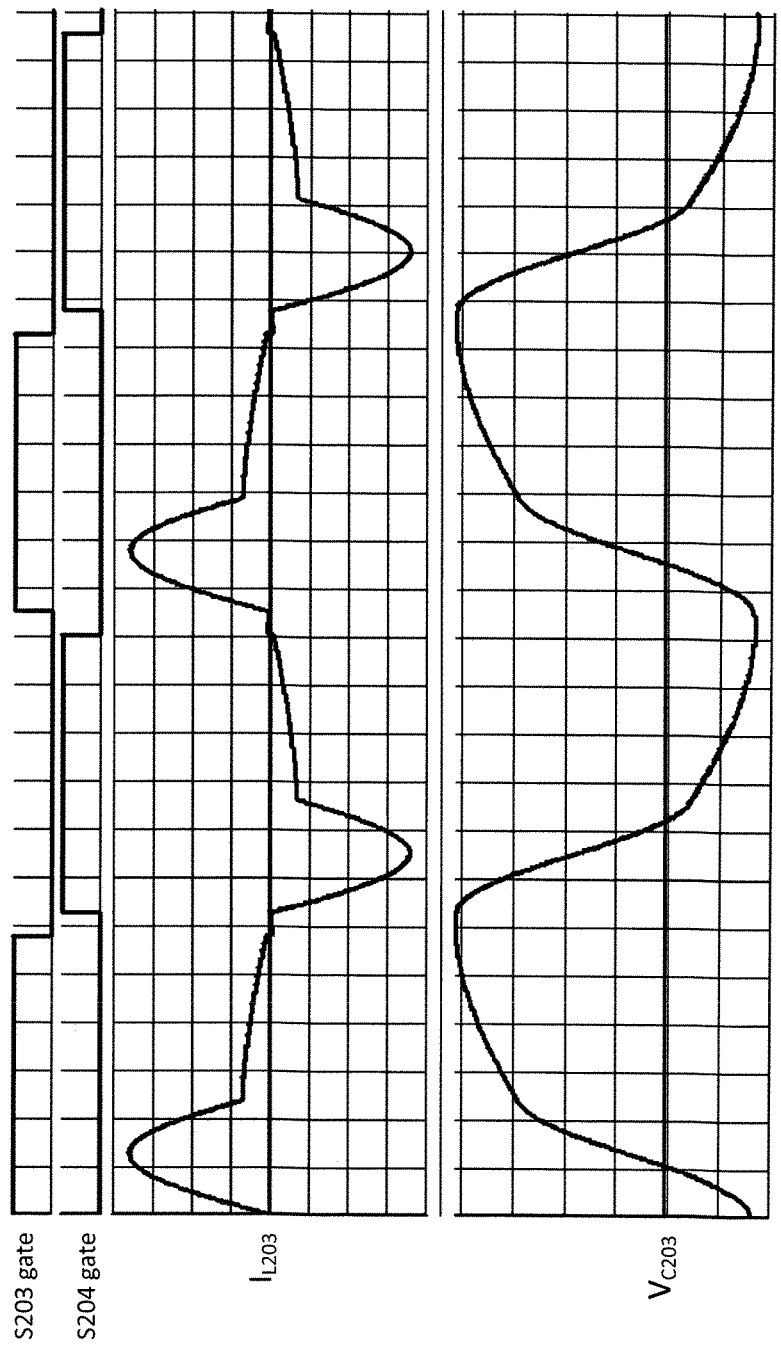
FIGS. 5A, 5B, and 5C show a set of waveforms illustrating operation of the DC side of the power converter of FIG. 2C.
Figure 5B:
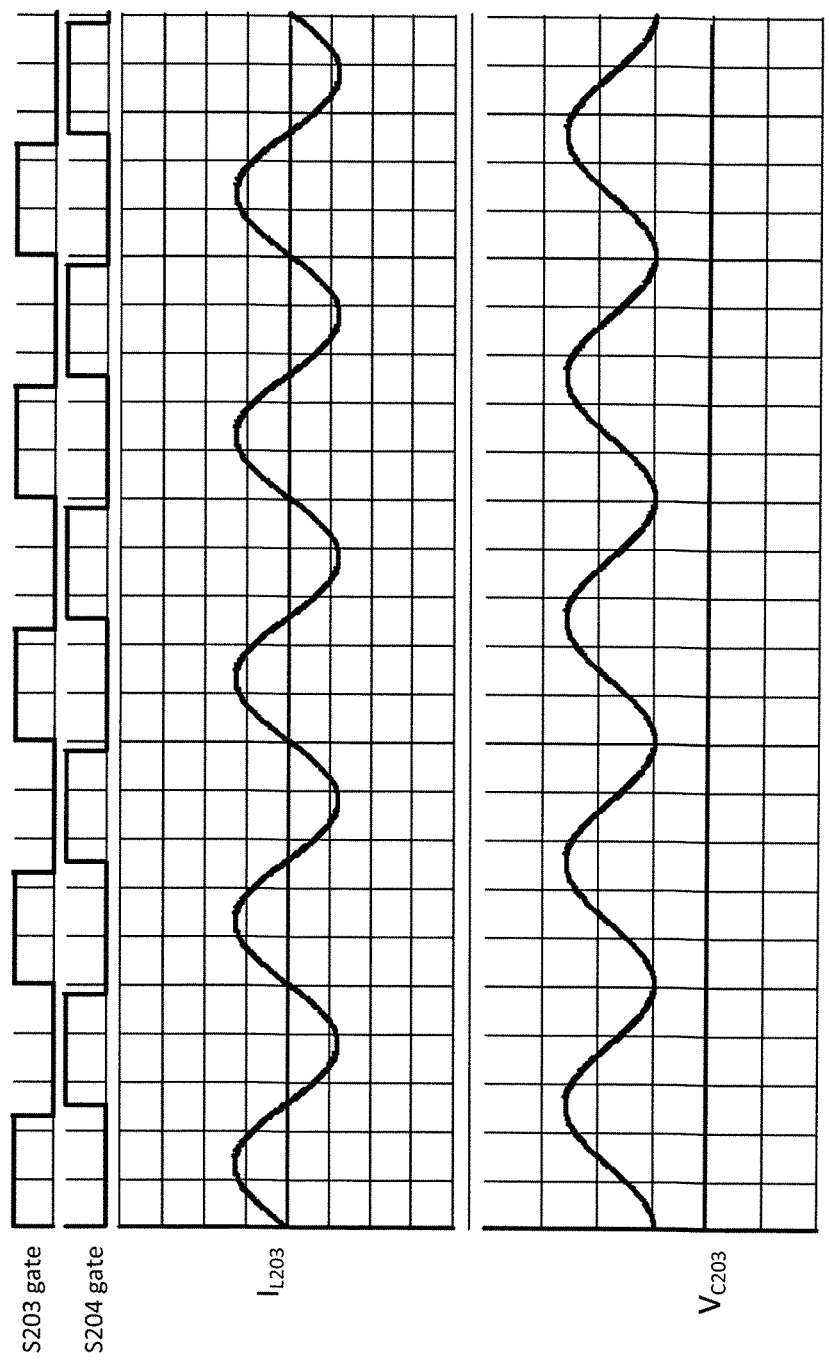
Figure 5C:
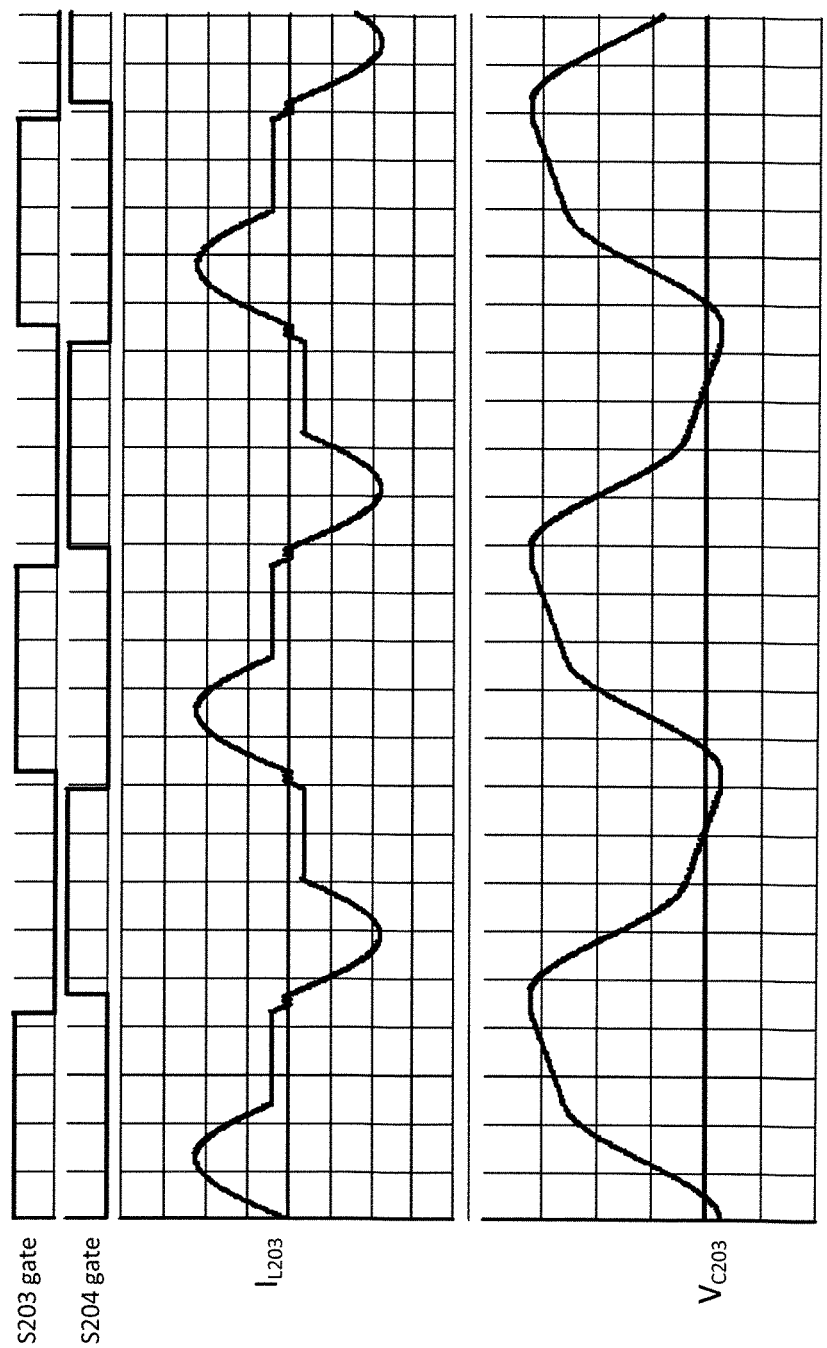

FIGS. 5A, 5B, and 5C show a set of waveforms illustrating an example operation of the circuit in FIG. 2C. All three figures show graphs to the same time and amplitude scaling. FIG. 5A shows operation at the lower resonant frequency. FIG. 5B shows operation at the upper resonant frequency. FIG. 5C shows operation at a frequency between the lower and upper resonant frequency. Due to the energy stored in the magnetizing inductance of TX202 and due to the parasitic capacitance of devices S203 and S204, the voltage across S203 and S204 commutates to zero during the switching dead-times, thus providing zero-voltage switching. In addition, as can be seen from the waveforms in FIG. 5A, the current through S203 and S204 is close to zero when they switch, thus providing zero-current switching at the two resonant frequencies. As can be seen from FIGS. 5B and 5C, the current in S203 and S204 is not zero when they switch; however, the current is substantially lower than the peak current in the device.

It should be noted that when using a variable frequency LLC converter for the DC-DC stage, that it will be necessary to use feedback to regulate the DC output voltage. It is not practical to use a feed-forward method of regulation since the gain of the circuit varies with load.

The LLC converter illustrated in the DC-DC stage of FIG. 2C operates as a DC transformer when the converter is driven at the upper resonant frequency. When driven at frequencies other than the upper resonant frequency, the converter does not act as a DC transformer. When the switching frequency is above the upper resonant frequency, the circuit typically demonstrates a gain less than one for most output loads other than an output load that is an open circuit. For switching frequencies between the upper and lower resonant frequency, the converter has a gain greater than one, and the exact gain is dependent on the output load.

Due to the extremely low switching losses at the lower resonant frequency, it may be advantageous to drive the converter at the lower resonant frequency and in a burst mode when a gain greater than one is required. In other words, an efficient method of operation may involve holding the operating frequency at the lower resonant frequency when the required gain is greater than one, and then turning the controller on and off at intervals much greater than a single switching period in order to regulate the output voltage. The trade-offs between using a burst-mode at the lower resonant frequency and using a continuously operating controller at frequencies between the upper and lower resonant frequency will depend on the specific components being used and the output loads. For any given converter application there might be regions of operation that benefit from a burst-mode at a resonant frequency and other regions of operation that benefit from use of a continuously operating controller at off-resonant frequencies.

DC-AC Inverter Operation

Refer again to FIGS. 2B and C. The voltage across C202 is a constant voltage other than the double-line-frequency ripple that appears across it. For example, the voltage across C202 might be held at 410V with a 100 Hz peak-to-peak ripple of 30V at full load for a 50 Hz AC output.

Diodes D211 and D213 are typically high-voltage Schottky diodes to shunt current from the body diodes of S211 and S213 respectively and thereby reduce switching losses. Diodes D211 and D213 are not needed for operation of the inverter but they are preferred to keep the switching losses low. It is also possible to place diodes in anti-parallel with S212 and S214 or one can use the body diodes built into S212 and S214.

Figure 6:
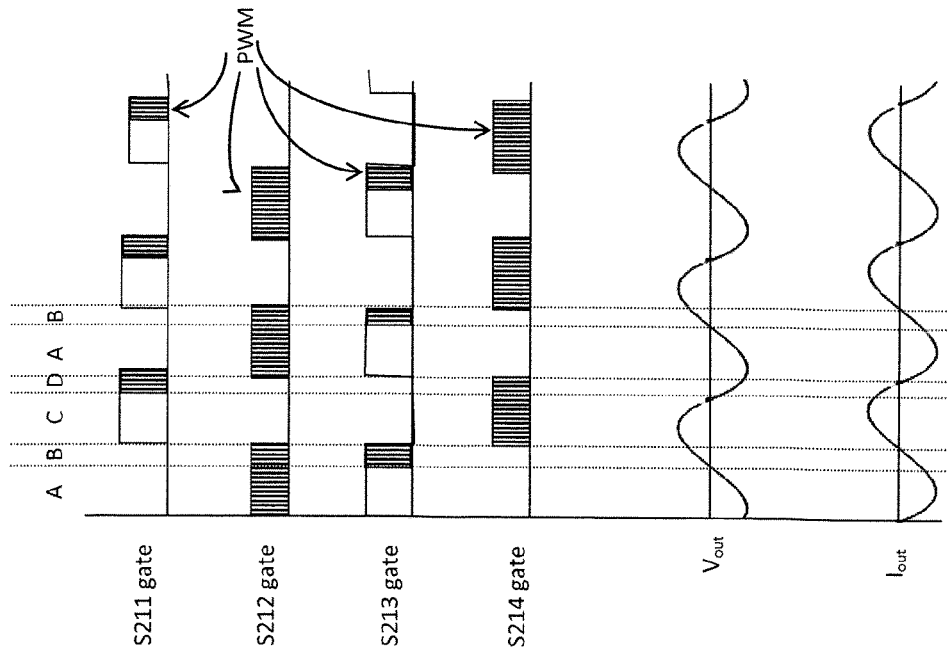
FIG. 6A and FIG. 6B show a sets of waveforms illustrating operation of the AC side of the power converters of FIG. 2 with and without a phase-shift, respectively.
Figure 6:
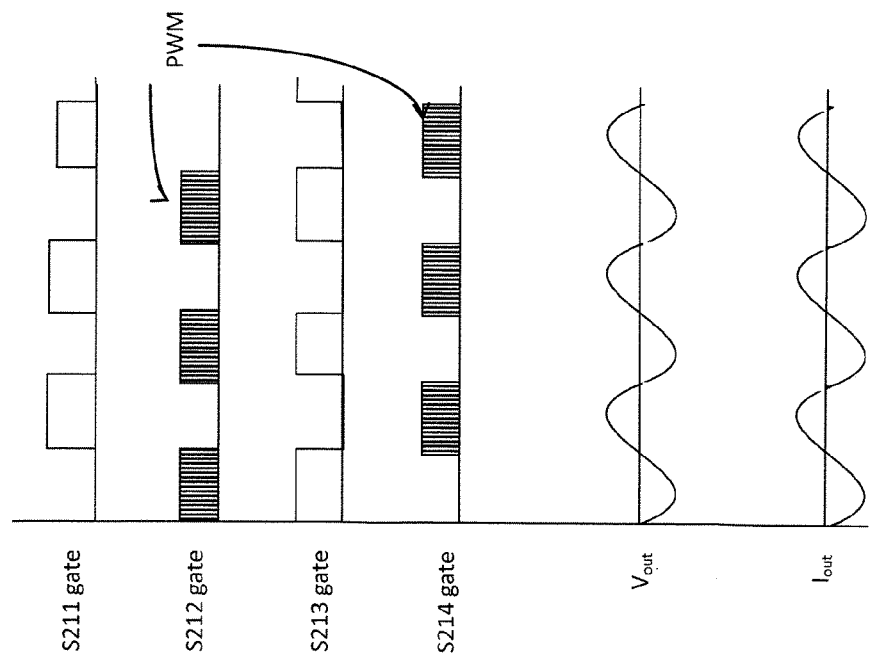

Controller 290 operates switches S211, S212, S213, and S214 in such a way as to produce a sinusoidal current through L202. FIG. 6A and FIG. 6B show sets of waveforms for a preferred method for operating switches S211, S212, S213, and S214. FIG. 6A shows example waveforms when the output current is in phase with the output voltage. FIG. 6B shows example waveforms when the output current is out of phase with the output voltage. Waveforms S211 gate, S212 gate, S213 gate, and S214 gate represent gate drive for S211, S212, S213, and S214 respectively. Shaded areas of the waveform represent sections of the gate drive which are pulse-width-modulated at high-frequency.

When the output current is in phase with the output voltage (unity power factor), one can see from FIG. 6A that S211 and S213 switch at low frequency (e.g. 50 Hz) to reduce switching loss. When S212 and S214 are pulse-width modulated, output inductor current alternatively flows through S212 or S214 (depending on polarity) when the corresponding switch is ON, or the current flows through D211 or D213 (depending on polarity of the current) when the opposing switch is OFF. It is therefore preferable to use high-voltage Schottky diodes such as Silicon Carbide diodes for D211 and D213. In this mode of operation, no current flows through the body diodes of S212 or S214, so no external diodes are needed across those two switches.

When the output current is out of phase with the output voltage, one can see from FIG. 6B that S211 and S213 only switch at low frequency for the time during which the output voltage and output current have the same polarity. When the output voltage and output current have opposite polarity, it is necessary to pulse-width-modulate S211 and S213. Since typical efficiency measurements are performed only at unity power factor, it may or may not be necessary to add high-voltage Schottky or fast recovery diodes across S212 and S214, depending on the required THD at non-unity power factor and the overall ability of the inverter to dissipate heat.

Figure 7:
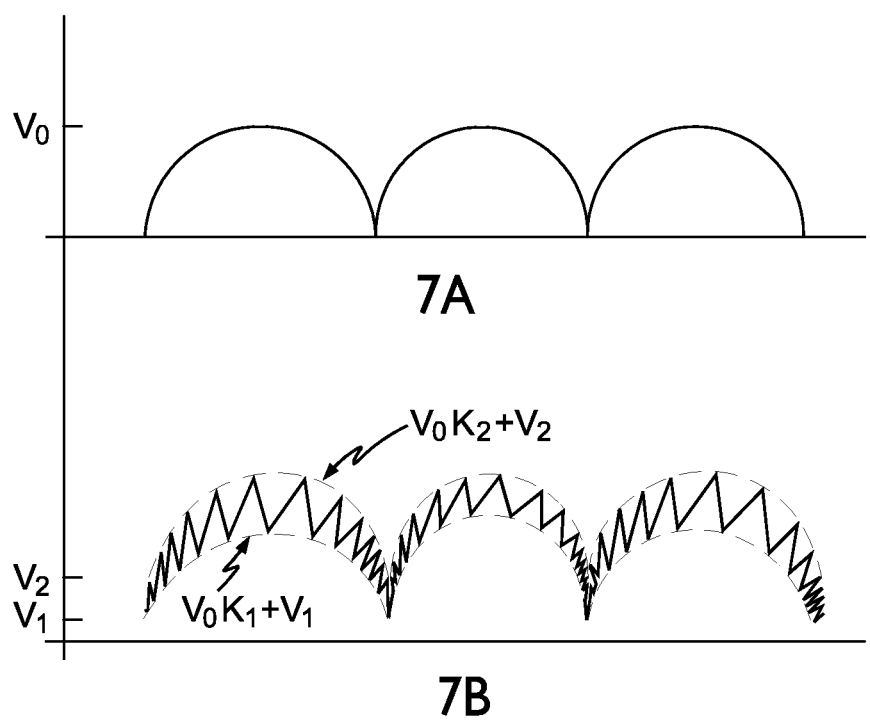
FIGS. 7A and 7B show waveforms used to generate a sinusoidal current at the output of the power converter of FIG. 2.

FIG. 7 demonstrates an implementation for generating pulse-width-modulation signals for switches S212 and S214, as well as for the sections of S211 and S213 waveforms that require pulse-width-modulation. The upper plot in FIG. 7 shows a reference rectified sinusoid generated by Controller 290. The reference sinusoid has amplitude that is proportional to the desired output power and which has a frequency equal to the output voltage (with slight variations that may be necessary, for example, for imposing an anti-islanding algorithm). The phase of the reference rectified sinusoid reflects the desired phase of the output current with respect to the output voltage. In some implementations, it might also be beneficial to impose short dead-times (not shown) between the trailing edge of one rectified sinusoid and the leading edge of the following rectified sinusoid.

Controller 290 then generates multipliers k1 and k2 as well as small offsets V1 and V2. Multiplier k1 is slightly smaller than 1.0 and multiplier k2 is slightly larger than 1.0. The sum of k1 and k2 is approximately 1.0. Controller 290 then compares a current sense signal that represents rectified output current with the upper and lower reference signals shown in the lower plot of FIG. 7. As can be seen from the plot, the PWM frequency will be lower at the peak of the rectified sinewave and higher near the zero-crossings. Offsets V1 and V2 can be adjusted to change the maximum switching frequency near the zero-crossings. The difference between k2 and k1 is inversely proportional to the switching frequency near the peak of the rectified sinewave. Parameters V1, V2, k1, and k2 can be adjusted for any given design to trade off output current THD with switching losses in the converter. This method of control provides several advantages. For example, the ripple produced near the peak of the sinewave is naturally greater than the ripple near the zero-crossings, thus minimizing impact on THD. Furthermore, the switching frequency is naturally smaller at the peaks where switching losses would typically be much higher, thus significantly reducing switching losses. The naturally occurring spread-spectrum frequency as well as the reduction of frequency near the peaks will both reduce the EMI noise generated by the inverter. Also, adjustment of the four parameters (V1, V2, k1, and k2) provide an easy-to-implement method to trade off switching losses with output current THD.

Figure 8:
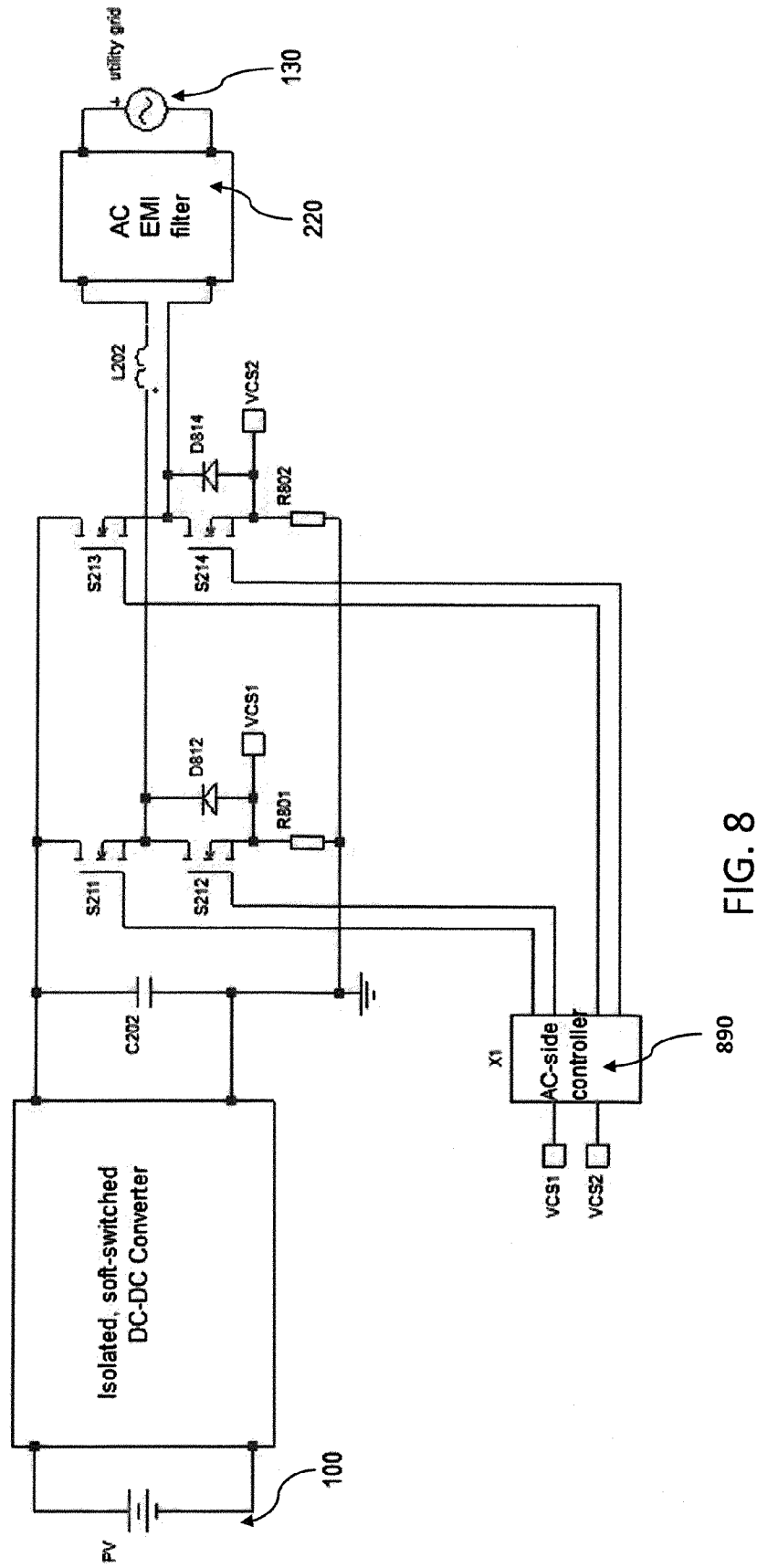
FIG. 8 shows an implementation of the present invention that enables the controller to produce the waveforms shown in FIG. 7.

Inverter operation as described above requires measurement of the current in inductor L202. Measurement of the inductor current can be challenging due to the high-voltage and fast-changing common-mode voltage on L202. One can use a DC current sensor for this challenging measurement; however, DC current sensors are both inexpensive and often have offset drift issues. Another method to measure the inductor current is shown in FIG. 8. To implement this current-sensing method, the role of the upper and lower switches must first be reversed—that is, the lower switches must be the ones that are sometimes switched at grid frequency and the upper ones switched at high-frequency. That will guarantee that the commutating high-frequency current always flows through a lower switch. The current that needs to be observed is then always flowing into the lower bus (circuit common). Addition of sense resistors R801 and R802 then allows low-voltage sensing of the current flowing in switches S212, S214, D812, and D814.

If one of the lower switches S211 and S213 are switched at grid frequency while one of the upper switches S212 or S214 are switched at high-frequency, then the high-frequency current will alternate between flowing through an upper switch and the opposing lower diode. That is the current will alternate flowing between S211 and D814 or between S213 and D812 depending on which switch is pulse width modulated at high-frequency. During switching, the current will remain in the lower switch that is not being pulse width modulated. One can thus measure the current in L202 by measuring the voltage across the appropriate sense resistor.

If both lower and upper switches are pulse width modulated (as is the case when grid voltage and frequency are out-of-phase), then the inductor current will appear in one sense resistor when the switches are turned on, and then will appear in a negative direction in the opposing sense resistor when the switches are turned off. The current through inductor L202 therefore appears across some combination of the sense resistors at any given time, depending on whether all four bridge switches are pulse width modulated, or only the lower two switches are pulse width modulated.

For the case of unity power factor and positive grid voltage, S214 is held ON while high-frequency current commutates between S211 and D814. Inductor current is proportional to VCS2. For the case of unity power factor and negative grid voltage, S212 is held ON while high-frequency current commutates between S213 and D812. Inductor current is proportional to VCS1. For the case of positive grid current and both switches pulse width modulated, inductor current commutates between S211-S214 and D812—the body diodes of S213. In this case, the inductor current is proportional to VCS2-VCS1. Similarly, when there is negative grid current and both switches are PWM3ed, inductor current will be proportional to VCS1-VCS2.

One can implement the strategy that was shown in FIG. 7 by use of four comparator circuits. The first comparator circuit will compare the desired level of current to VCS1. The secondary comparator circuit will compare the desired level of current to VCS2. The third comparator circuit will compare the desired level of current to VCS1-VCS2. The fourth comparator circuit will compare the desired level of current to VCS2-VCS1. Controller 890 can then use the appropriate comparator output depending on phase of the grid current and whether or not the lower switch is being pulse width modulated. This novel method of current sensing allows for use of inexpensive sense resistors and gets around the expense and inaccuracies of using a high-frequency DC current sensor.

Grid-tied inverters with high-voltage capacitors on their DC bus have a startup issue. As soon as the AC voltage is connected, the body diodes of the AC bridge switches conduct current to instantly charge the DC bus capacitor. For electrolytic capacitors, the relatively high AC resistance of the capacitors limits the current to levels which are relatively safe for the semiconductor switches. For non-electrolytic capacitors, the AC capacitor resistance can be so low, that the high inrush current may destroy the AC bridge semiconductor switches upon connection to the AC grid.

Many standard methods are known in the art to avoid high inrush currents at startup. These typically involve addition of an impedance in series with the grid. Some methods also include a switch to short circuit the impedance after startup. Both of these methods have undesirable side effects. In the case where the impedance remains in the circuit after startup, there are additional losses in normal operation. In the case where there is a relay that shorts the impedance, the relay presents long-term reliability issues. In the case where a semiconductor is used to short the extra impedance after startup, that semiconductor would have to conduct bidirectionally, thus adding a lot of complex gate-drive circuitry, cost, and losses associated with current flow through both semiconductors.

Figure 9:
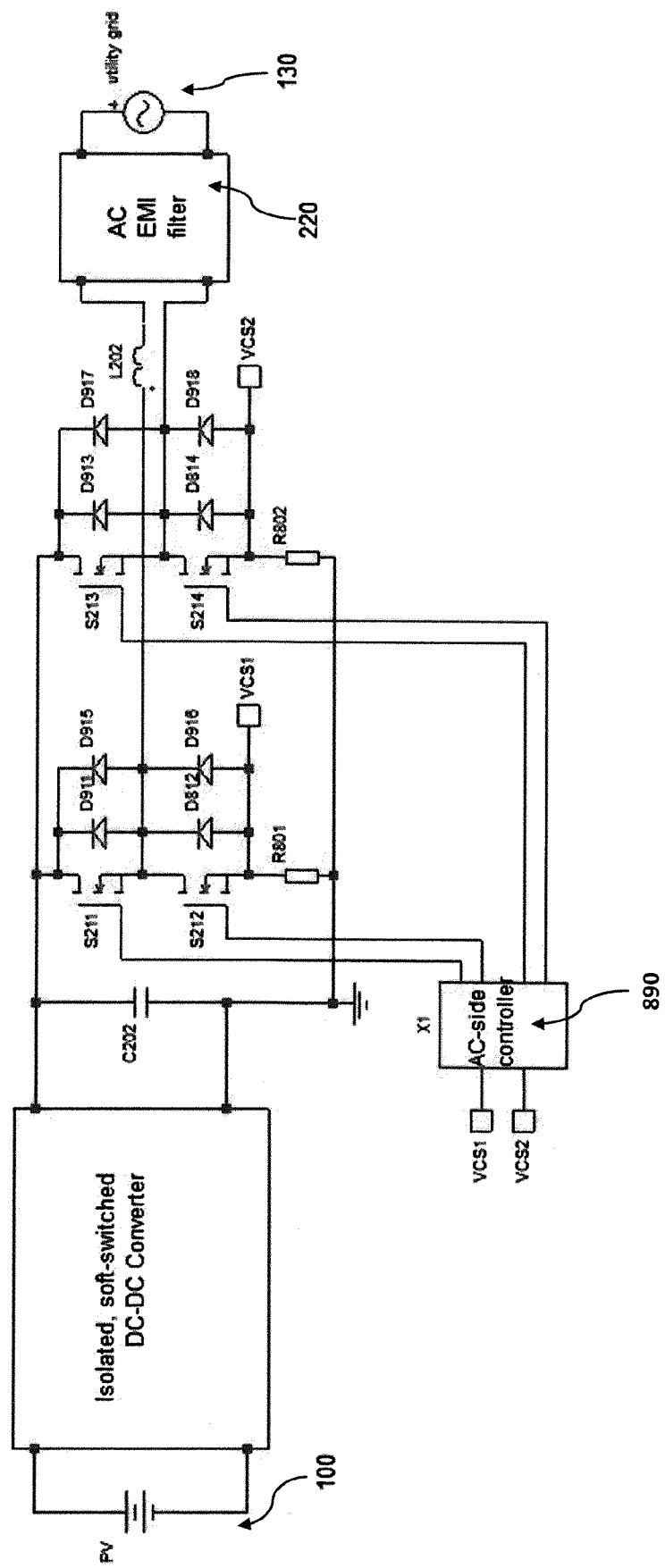
FIG. 9 shows and implementation of the present invention.

An alternative method is shown in FIG. 9. Low-speed, high-current diodes are placed in series with the semiconductor switches. Furthermore, Silicon Carbide diodes are added in parallel with the upper switches. The result is that high-frequency switching current passes through the Silicon Carbide diodes; however, the low-frequency, high inrush current passes through the slower high-current diodes.

Figure 10:
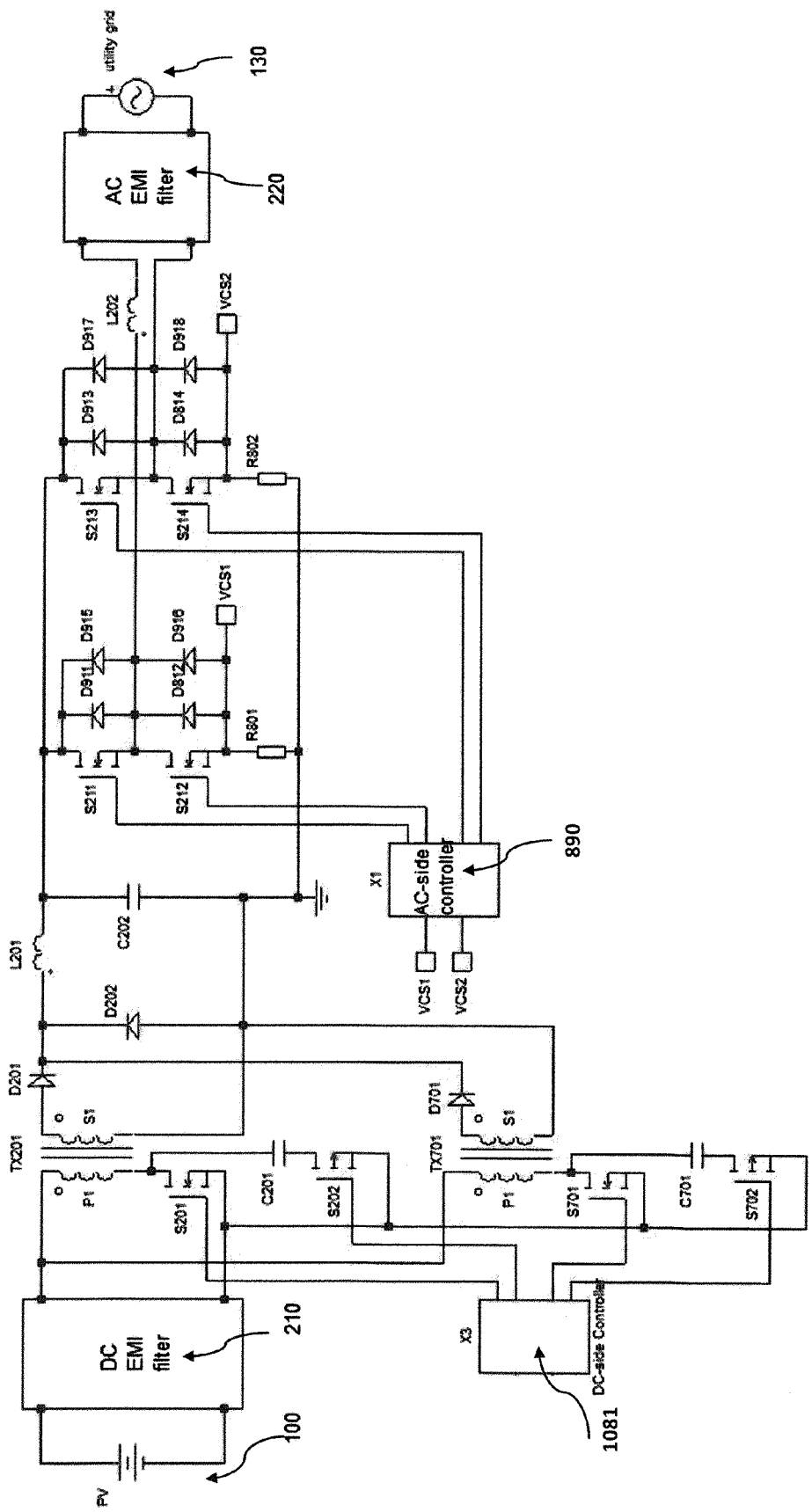
FIG. 10 shows a preferred embodiment of the present invention.

FIG. 10 shows a simplified schematic of another preferred embodiment of the present invention. The circuit shown in FIG. 10 is the same as that shown in FIG. 2B, except that the input converter stage formed by TX201, S201, S202, C201, and D201, is replicated by components TX701, S701, S702, C701, and D701 and the AC section is replaced by the one shown in FIG. 9. Replication of the input converter stage has several advantages including the following: The two input converter stages may be operated out-of-phase to effectively double the ripple frequency (and therefore halve the current ripple) of inductor L201; at low power levels, one of the two input converter stages can be shut off to reduce losses and increase efficiency. Operation of the converter shown in FIG. 10 is much the same as that of the converter shown in FIG. 2B except that the switch S201 is operated 180 degrees out-of-phase to switch S701, switch S202 is operated 180 degrees out-of-phase to switch S702, and the duty cycles of switches S201 and S701 for the converter in FIG. 10 are only half of the duty cycles for the converter in FIG. 2B. The dead-times between switches S201 and S202 are the same for the converter in FIG. 2B as for the converter in FIG. 10. As already stated, the ripple current in L201 is reduced by a factor of 2 due to the effective doubling of the ripple frequency by operating the two DC-to-DC converter sections 180 degrees out-of-phase with respect to each other. Diode D202, inductor L201, and DC bus cap C202 are shared between the two input DC-to-DC converters.

Figure 11:
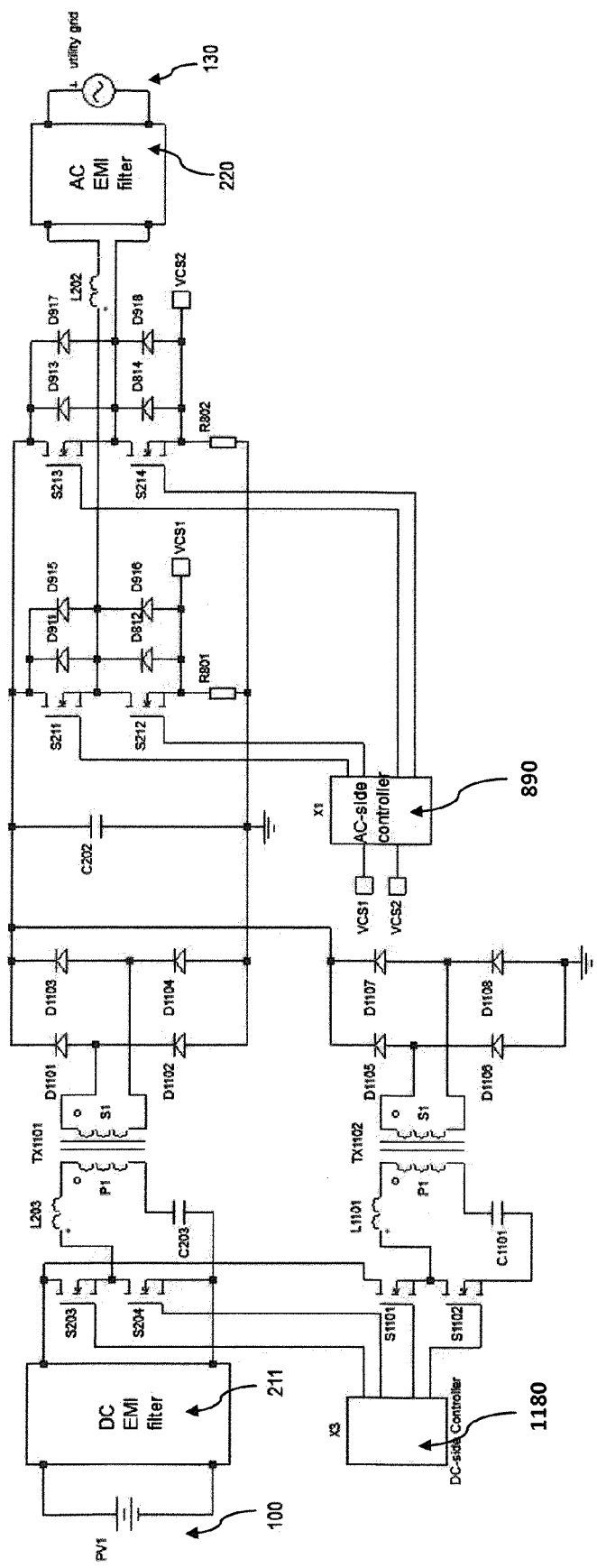
FIG. 11 shows another preferred embodiment of the present invention.

FIG. 11 shows a simplified schematic of another preferred embodiment of the present invention. The circuit shown in FIG. 11 is the same as that shown in FIG. 2C, except that the input converter stage formed by TX202, S203, S204, C203, L203, and output diodes is replicated. Furthermore, rather than use a split transformer with single diode outputs, each stage uses a single transformer with full-bridge diode outputs. Also the AC stage is replaced by the one shown in FIG. 9.

Operation of the converter shown in FIG. 11 is much the same as that of the converter shown in FIG. 2C except that the switch S203 is operated 90 degrees out-of-phase to switch SI101, switch S204 is operated 90 degrees out-of-phase to switch S1102. The dead-times between switches S203 and S204 are the same for the converter in FIG. 2C as for the converter in FIG. 11.

Certain construction and operation of the magnetic components, when combined with the circuit and operation described in the previous sections, lead to further advantages as now described.

Figure 12:
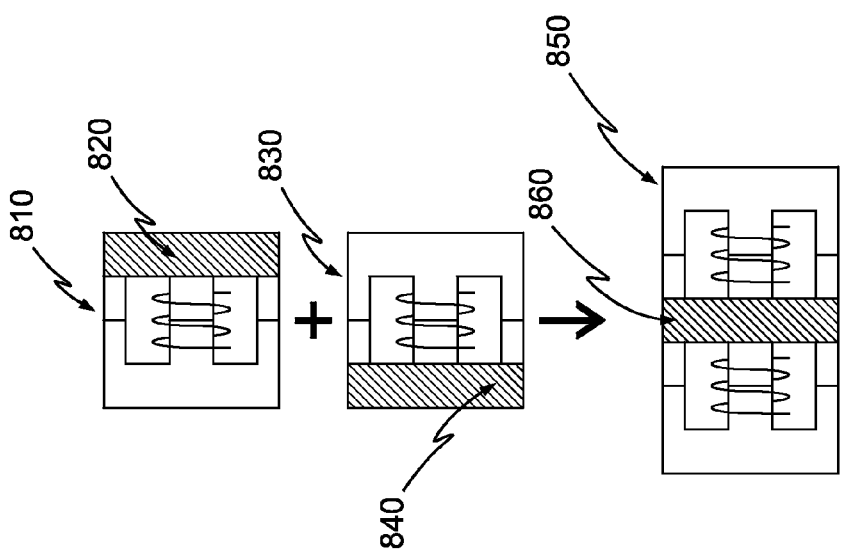
FIG. 12 shows a drawing of a transformer according to an implementation of the present invention.

FIG. 12 shows two individual transformers 810 and 830 that could have been used individually for components T201 and T701 shown in FIG. 10. Since T201 and T701 will typically be operated 180 degrees out-of-phase with each other, the flux in legs 820 and 840 will therefore be 180 degrees out-of-phase with each other. The peak flux through legs 802 and 840 will be the same as the peak of the sum of the flux through 820 and 840. As a result, legs 820 and 840 can be combined to form transformer 850. Leg 860 in transformer 850 is the same size as leg 820 or leg 840. The total core material, and therefore the cost of the structure in 850 is noticeably lower than the sum of the core material of 810 and 830. A preferred implementation of the present invention combines transformers T201 and T701 in such a way as to eliminate the core material of one outer leg of the transformer. Note that the drawings in FIG. 12 show E-E core transformers; however, the principal of core size reduction can easily be applied in the same manner to any core geometry. The principle shown FIG. 12 will also work for the converter embodiment that was shown in FIG. 11, except that the flux cancellation will be somewhat smaller due to the decreased phase shift.

There is also advantage to be gained by designing inductors L201 and L202 (in FIGS. 2, 8, 9, 10, and 11) in such a way that the inductance at large loads (e.g. 100% load) is substantially lower (e.g. a factor of 2) than the inductance at smaller loads (e.g. 10% load).

Figure 13:
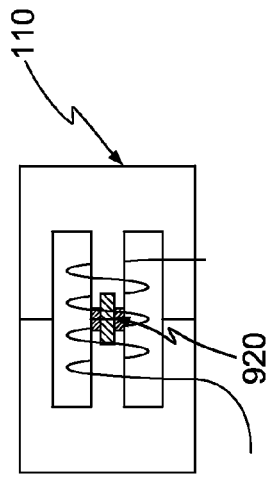
FIG. 13 shows a drawing of an inductor according to an implementation of the present invention.

For the DC-side input converter, the current through inductor L201 (in FIG. 2 and FIG. 10) must remain greater than 0 at all times for the converter to operate with zero-voltage-switching. For the current to remain positive at all times, the average value of current must exceed half of the peak-to-peak ripple current. The ripple current is inversely proportional to inductance and to switching frequency. Since the average current through the inductor is proportional to load power, it is to great advantage to reduce the ripple current at small loads. This ripple reduction can occur by increasing the inductance at small loads or by increasing the frequency at small loads. One method of increasing the inductance at small loads is to create a stepped air gap as shown in FIG. 13. When the flux increases above a certain level, the core material around the stepped air gap will saturate, effectively increasing the size of the air gap and thus decreasing the inductance. More than one step in the air gap can be used as necessary to create a desired profile of inductance versus load. Other techniques can be used to design the inductor to have a much higher inductance at small load than at full load. For example, a powdered iron core material can be used that is designed to have a soft saturation at load levels below the full load point.

For the AC side of the converter it is important to obtain a low THD to comply with standard certification requirements. THD is most affected by the amount of inductor ripple near the zero-crossings of the output current. It would be advantageous to increase the inductance near the zero-crossings, which is also where the current is relatively low in value. The same technique as discussed above for the DC-side inductor L201 can be done for AC-side inductor L202 to produce advantage in obtaining low THD.

As was already mentioned, increasing the frequency of the DC-side converter at small load levels will help to maintain continuous conduction mode and thus enable zero-voltage switching. Increasing frequency at large loads can also gain advantage by reducing ripple and therefore reduce peak inductor current. Reduction of peak inductor current can lead to reduced inductor size. Furthermore, since efficiency is typically more important at partial power levels (such as 75% load) than at full power, increasing inductor frequency above a load level such as 75% load could lead to a smaller and lower-cost inverter with minimal impact on a weighted average efficiency of the inverter such as the California Energy Commission weighted average efficiency.

Figure 14:
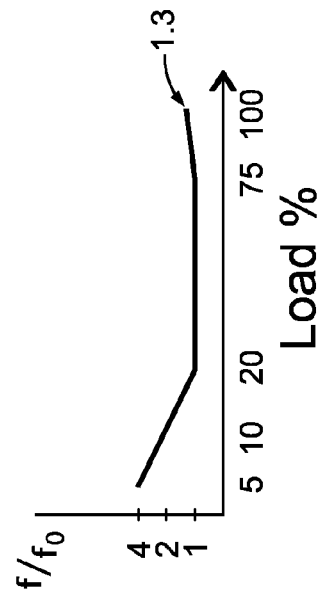
FIG. 14 shows an example operating frequency versus load for an implementation of the DC side of the power converter of the present invention.

FIG. 14 shows an example switching frequency profile for the DC-side converter, assuming use of a fixed value inductor. If the inductance is also designed to vary with load, the values of frequency change would have to be adjusted accordingly. Since a California Energy Commission weighted efficiency accords high weight to 75% load and very small weight to 100% and 10% load, the frequency can be made to increase below 20% load and above 75% load in such a way that the peak inductor current at 100% load is the same as the peak current at 75% load, and the minimum inductor current at the lowest operating load (for example 5% load) might be the same as the minimum inductor current at 20% load.

Many other effective alternatives will occur to a person skilled in the art. It should be understood that the invention is not limited to the described embodiments and encompasses modifications apparent to those skilled in the art lying within the scope of the following claims:

We claim:

1. A power converter for use with a photovoltaic DC power source comprising:
   a DC input configured to receive DC power;
   an AC output configured for direct connection to an AC mains power supply line having a frequency and a phase;
   said DC input coupled to an isolated DC-DC converter stage, said DC-DC converter stage comprising a first controller configured to regulate an output voltage of the DC-DC converter stage to a substantially constant value;
   a non-electrolytic capacitor coupled to said DC-DC converter, wherein said capacitor is capable of storing the difference in energy between power provided at said DC input and fluctuating AC mains power; and
   a DC-AC inverter coupled to said non-electrolytic capacitor for producing an AC current at said AC output wherein the produced AC current matches the AC mains frequency but can be at a phase different from the phase of the AC mains frequency, wherein said DC-AC inverter further comprises a first magnetic component comprising an inductance and—
      a full bridge that comprises first, second, third, and fourth controllable semiconductor switches such that the first magnetic component is placed between the full-bridge and said AC output, and
      a second controller coupled to said first, second, third, and fourth controllable semiconductor switches, wherein said second controller is configured to produce a reference waveform at the same frequency as the AC mains supply voltage but at a phase which may be different from the AC mains supply voltage, and said second controller is further configured to switch at least one of the first, second, third, and fourth controllable semiconductor switches using high-frequency pulse-width modulation to produce an AC current at said AC output such that said AC current matches the reference waveform in frequency and phase.

2. The power converter of claim 1 in which said DC-DC converter stage further comprises a soft-switched DC-DC converter.

3. The power converter of claim 2, said soft-switched DC-DC converter further comprising:
   a fifth controllable semiconductor switch coupled to said DC input and to a second magnetic component comprising at least two windings, a core, and a flux path;
   a sixth controllable semiconductor switch coupled to said second magnetic component and a first electronic component comprising a capacitance;
   a second controller coupled to said fifth and sixth controllable semiconductor switches;
   a third magnetic component comprising an inductance coupled to said second magnetic component;
   first and second semiconductor components each comprising a diode coupled to said third magnetic component; and
   a second electronic component comprising a capacitance coupled to said third magnetic component,
   wherein said first controller switches said fifth controllable semiconductor switch at high-frequency to regulate a voltage across said second electronic component and said first controller switches said sixth controllable semiconductor switch at high-frequency to return energy stored in the said second magnetic component to the said DC input using a resonance of said first electronic component to reduce switching loss of said fifth controllable semiconductor switch.

4. The power converter of claim 3 further comprising:
   seventh and eighth controllable semiconductor switches coupled to said first controller and to said DC input;
   a third electronic component comprising a capacitance coupled to said seventh and eight switches;
   a third semiconductor component comprising a diode, said third semiconductor component being coupled to the said first semiconductor component; and
   a fourth magnetic component that comprises at least two windings, a core, and a flux path,
   wherein said first controller switches said seventh and eighth controllable semiconductor switches at high-frequency to return energy stored in the said fourth magnetic component to the said DC input using a resonance of said third electronic component to reduce switching loss of said seventh controllable semiconductor.

5. The power converter of claim 4, wherein said first controller utilizes pulse-width modulation and controls the pulse-width modulation duty cycle of said fifth and seventh semiconductor switches to be identical and either 90 or 180 degrees out-of-phase with each other, and further controls the pulse-width modulation duty cycle of said sixth and eighth semiconductor switches to be identical and either 90 or 180 degrees out-of-phase with each other.

6. The power converter of claim 4, wherein the first and fourth magnetic components share some core material in such a way that the size of the total core is reduced compared to the core required for each magnetic component individually and the flux path for each of the two magnetic components has some degree of cancellation in the shared part of the core.

7. The power converter of claim 3, wherein the power converter has a full-rated load and when the power converter is operating at its full-rated load, an inductance of the second magnetic component is reduced compared to an inductance of the second magnetic component when the power converter is operating at below its full-rated load.

8. The power converter of claim 7 wherein the core of the second magnetic component contains a stepped air gap.

9. The power converter of claim 3 wherein the first controller produces pulse-width-modulated gate drive signals at a substantially constant frequency.

10. The power converter of claim 9 wherein the pulse-width-modulation frequency is increased at a predetermined level of said full-rated load.

11. The power converter of claim 9 wherein the pulse-width-modulation frequency comprises a jitter to reduce electromagnetic interference created at any single frequency.

12. The power converter of claim 3 wherein said first magnetic component comprises an additional winding that provides power to said first controller or to said second controller.

13. The power converter of claim 1, wherein the power converter has a full-rated load and when the power converter is operating at its full-rated load an inductance of the third magnetic component is reduced compared to an inductance of the second magnetic component when the power converter is operating at loads below its full-rated load.

14. The power converter of claim 13 wherein the core of the third magnetic component contains a stepped air gap.

15. The power converter of claim 13 wherein an inductance of the third magnetic component when the power converter is operating at said full-rated load is less than half of an inductance of the third magnetic component when the power converter is operating at 10% of said full-rated load.

16. The power converter of claim 1 wherein said second controller produces a first signal and a second signal, said first signal and said second signal being rectified sinusoids with a DC offset and being in phase with each other such that the amplitude of said first signal is less than or equal to the amplitude of said second signal and the sinusoidal portion of said second signal divided by the sinusoidal portion of said first signal is a constant over the course of each half-cycle of the AC output, and said second controller compares the current flowing in an AC bridge comprised of said first, second, third, and fourth controllable semiconductor switches to said first signal and said second signal to determine whether to turn on any of said first, second, third, and fourth semiconductor switches in such a way as to either decrease or increase the current through the third magnetic component.

17. The power converter of claim 1 wherein the voltage across the non-electrolytic capacitor is controlled through feed-forward measurement of the input DC voltage.

18. The power converter of claim 1 wherein said DC-DC converter comprises an LLC converter.

19. The power converter as described in claim 18 wherein said LLC converter has two resonant frequencies and in some combinations of load and input range the LLC converter operates in a burst mode at the lower resonant frequency.

* * * * *